Jan. 19, 1932.  J. E. FERGUSON ET AL  1,842,158
AUTOMATIC SEASONING AND TESTING MACHINE
Filed Dec. 1, 1928  7 Sheets-Sheet 1
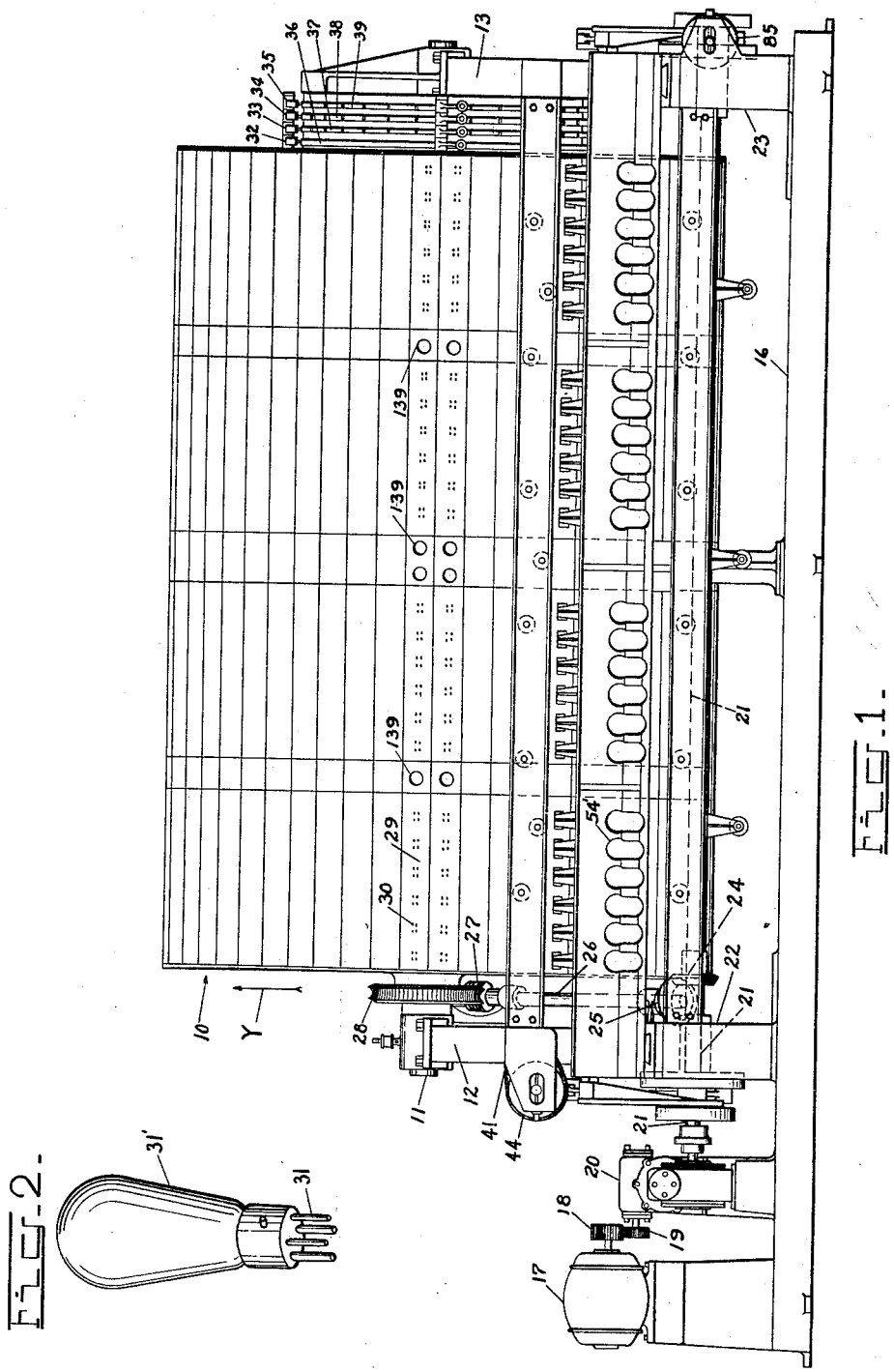
INVENTORS J.E.FERGUSON
C.A.NICOLAI
BY
ATTORNEY

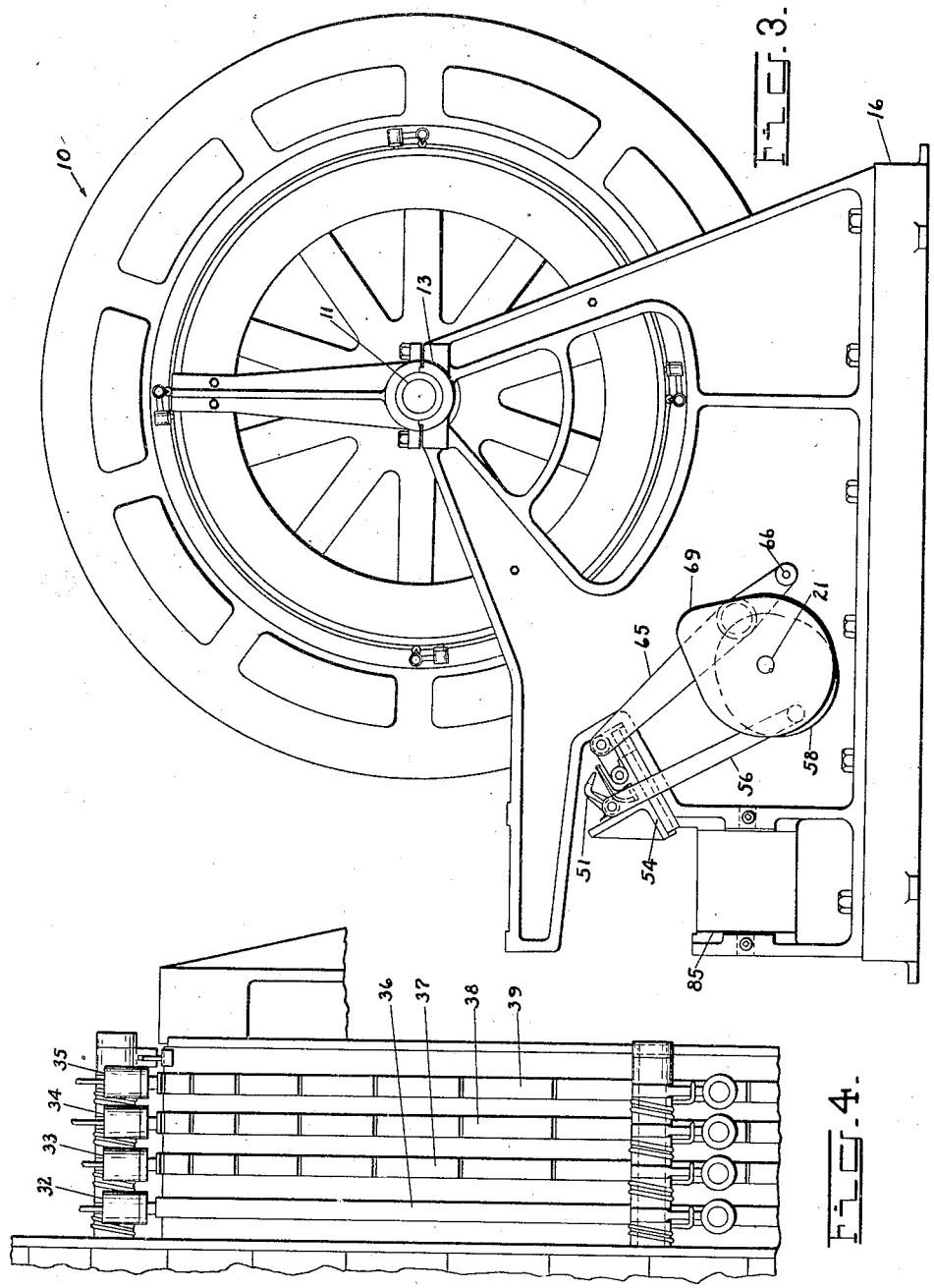

Jan. 19, 1932. J. E. FERGUSON ET AL 1,842,158
AUTOMATIC SEASONING AND TESTING MACHINE
Filed Dec. 1, 1928 7 Sheets-Sheet 3
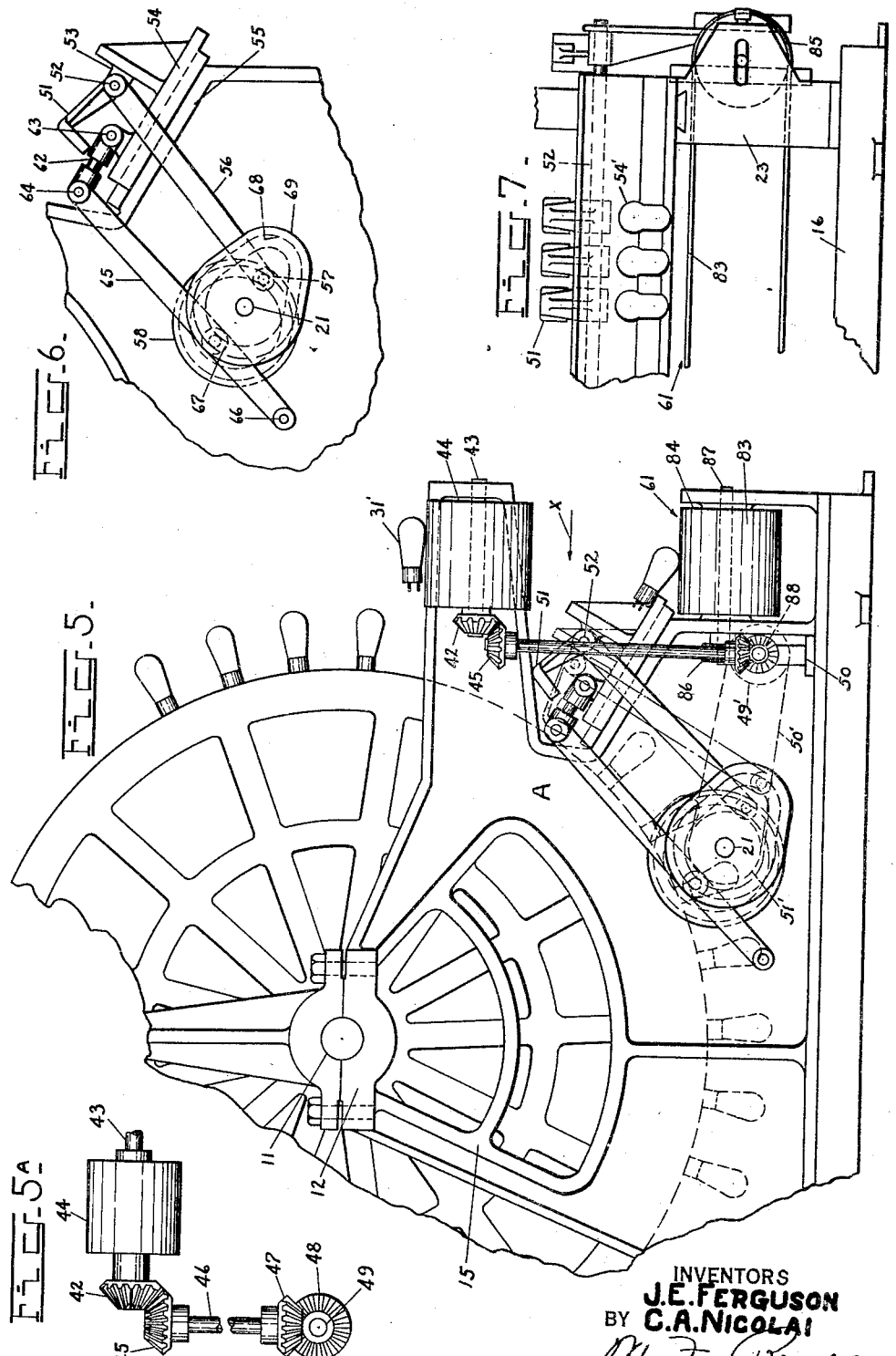
INVENTORS
J.E. FERGUSON
BY C.A. NICOLAI
ATTORNEY

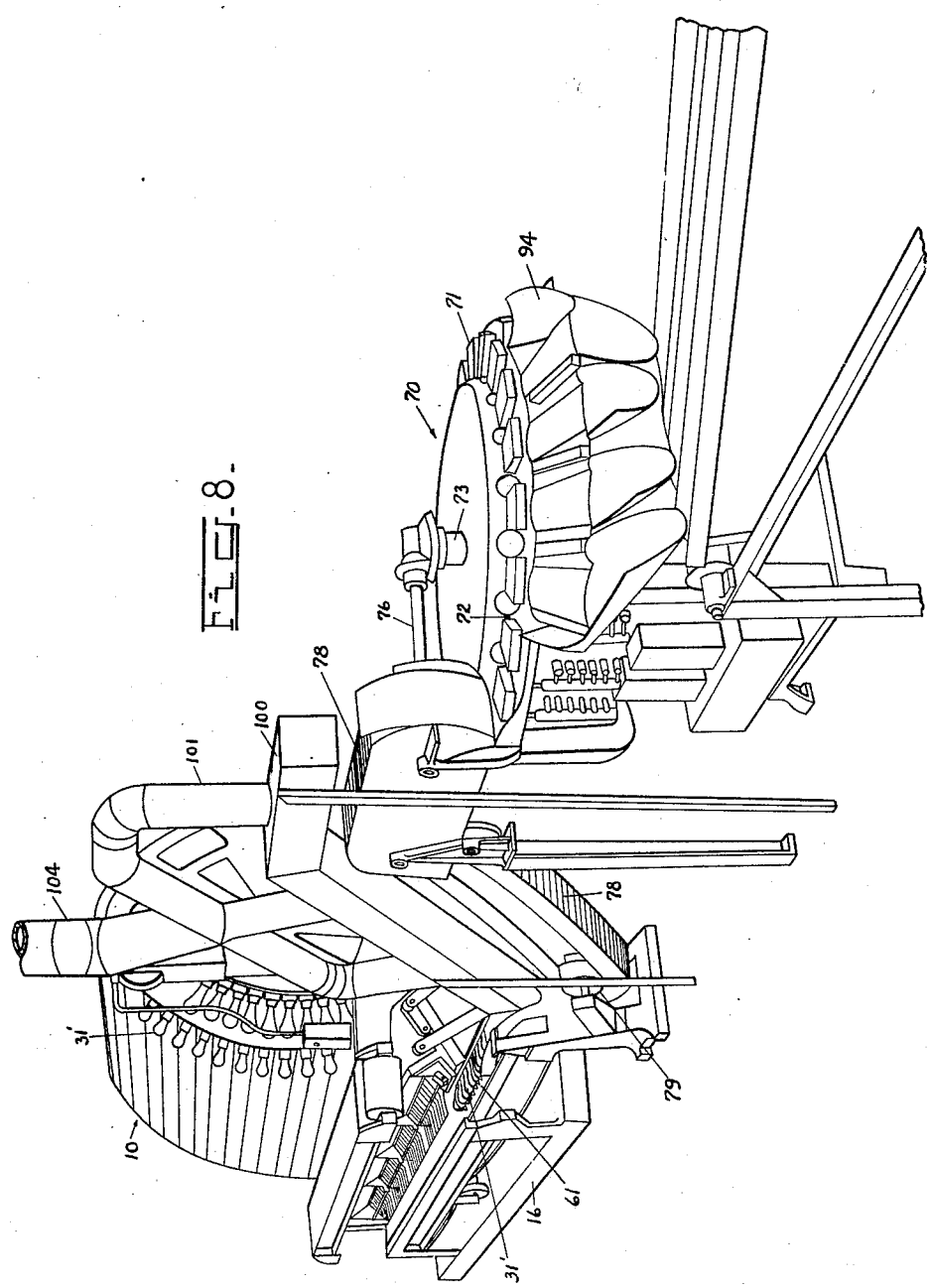

Jan. 19, 1932.    J. E. FERGUSON ET AL    1,842,158
AUTOMATIC SEASONING AND TESTING MACHINE
Filed Dec. 1, 1928    7 Sheets-Sheet 5
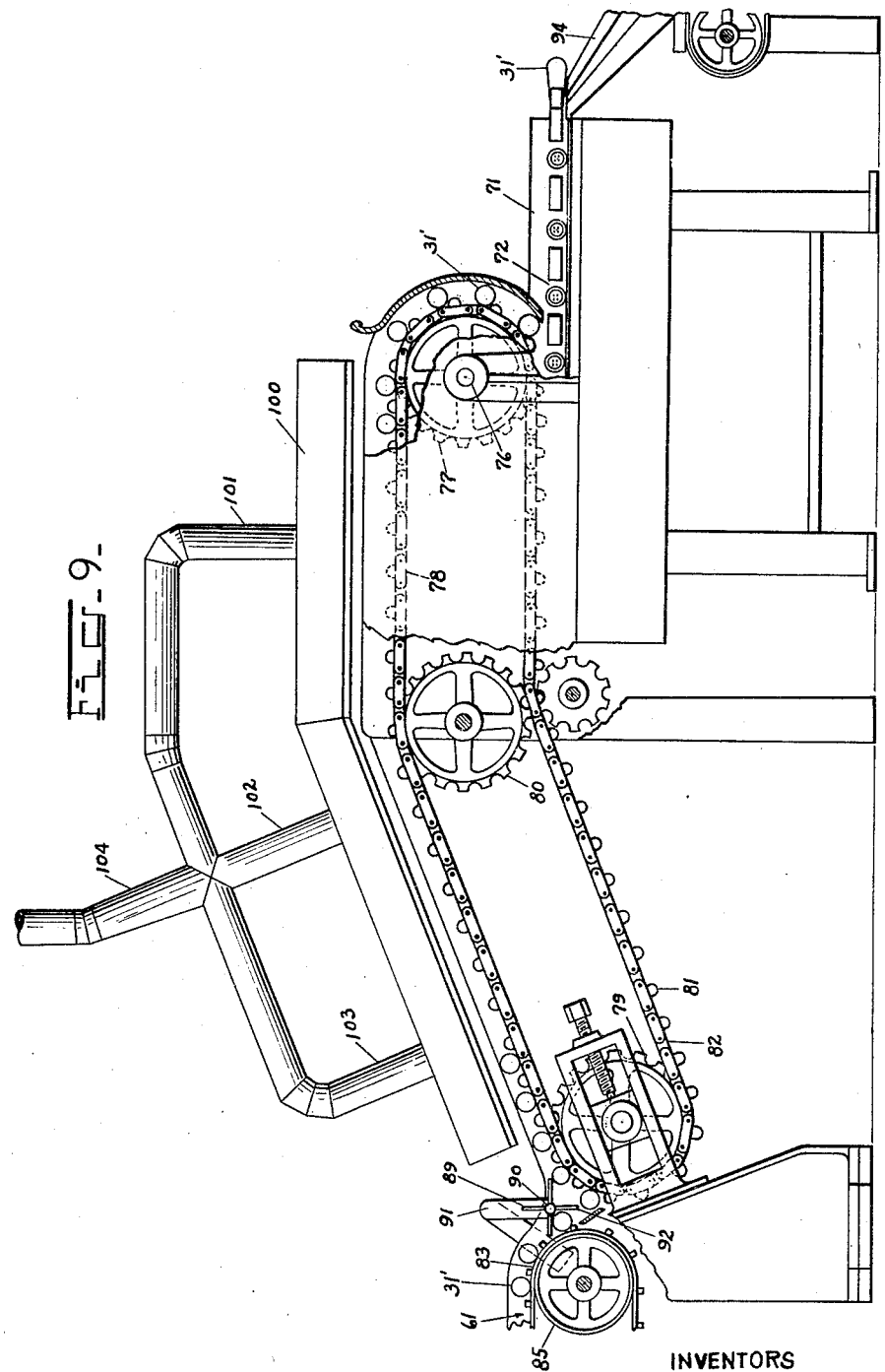

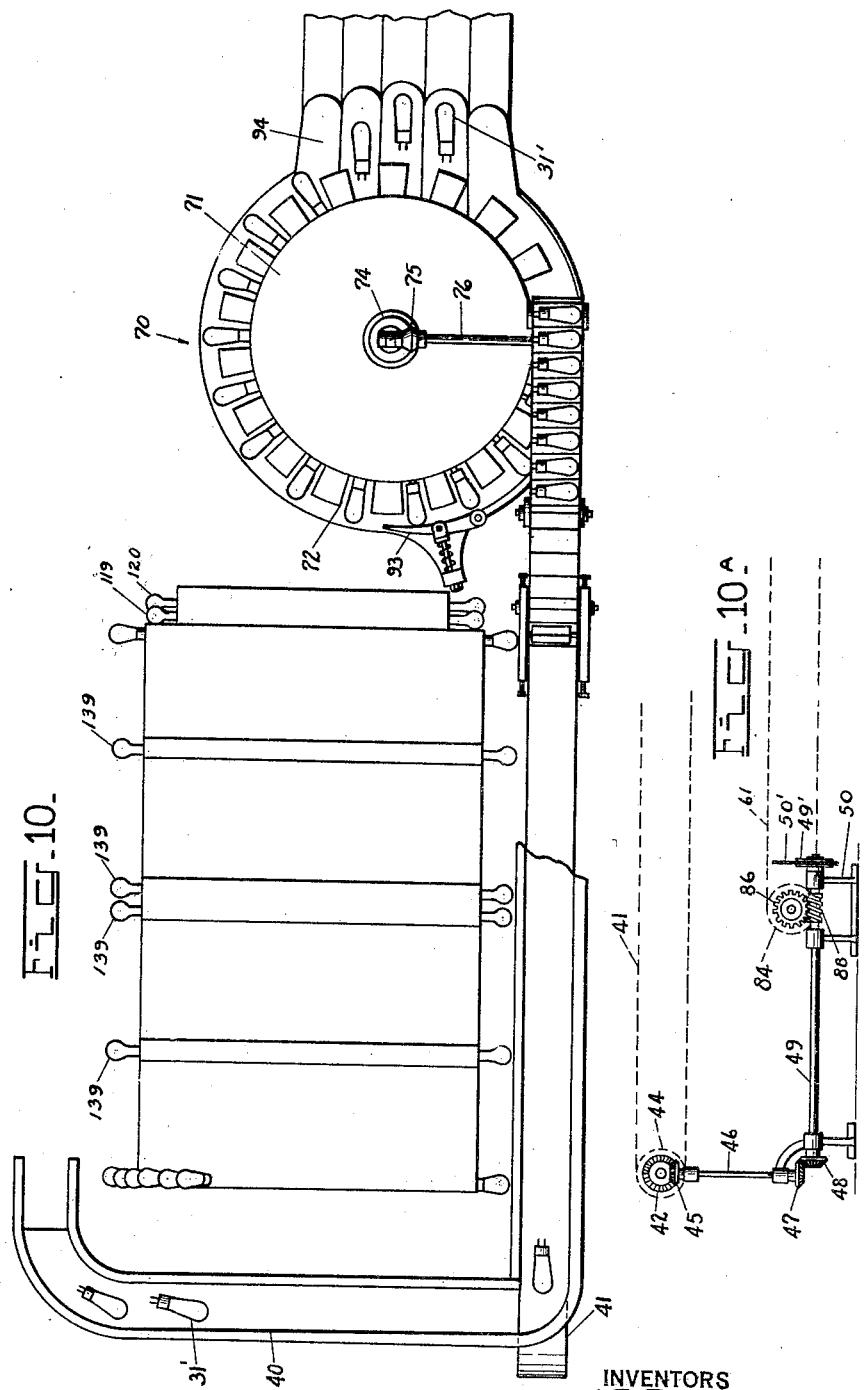

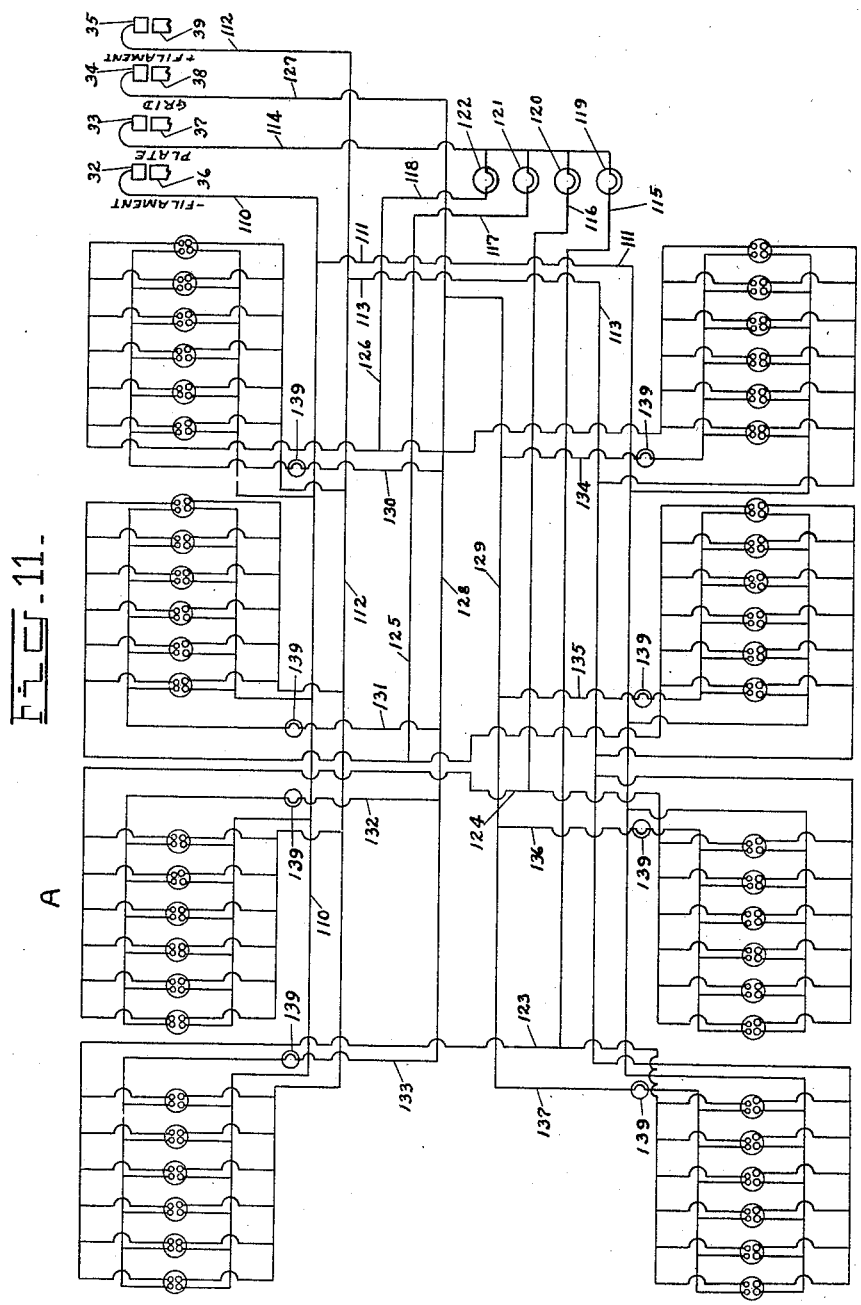

Patented Jan. 19, 1932

1,842,158

UNITED STATES PATENT OFFICE

JOHN E. FERGUSON AND CHARLES A. NICOLAI, OF BLOOMFIELD, NEW JERSEY, ASSIGNORS TO WESTINGHOUSE LAMP COMPANY, A CORPORATION OF PENNSYLVANIA

AUTOMATIC SEASONING AND TESTING MACHINE

Application filed December 1, 1928. Serial No. 323,094.

This invention relates to the manufacture of electrical devices such as radio tubes or the like and relates more particularly to the manufacturing operation, termed "seasoning" and to the combination of the seasoning operation with the operation of automatically testing electrical devices.

In the manufacture of thermionic devices such as radio tubes, it is necessary, after the devices are structurally completed, to subject them to what is termed a seasoning operation. This operation consists in applying a given voltage to one or more of the elements or electrodes within the devices in such manner as to cause an electron stream for the destruction of impurities upon certain of the internal electrodes, which operation may also serve to improve the vacuum by reducing such residual gas as may be contained within the device and although the present invention may be useful in connection with various types of electrical devices, it will be described and illustrated herein as applied to radio tubes.

The increasing popularity of the radio tube brings about a condition wherein it is necessary to manufacture the same at a high rate of speed, efforts being also made to reduce manufacturing costs. The various manufacturing steps for producing a radio tube have been highly developed to the end that most of the manufacturing steps may be performed at a high rate of speed. However one of the operations which has heretofore resisted efforts in the direction of high speed production had been the seasoning operation which operation materially retarded production in that it was slow in comparison with other manufacturing steps.

It had heretofore been the practice to perform the seasoning operation on a machine consisting of a conveyor in the form of a circular plate or disc having a plurality of sockets disposed in circular spaced relation in the form of concentric rings.

It was necessary for an operator, therefore, to load the disc, which rotated, by applying radio tubes to the sockets and to manually remove the radio tubes which had been given a seasoning operation. This manner of seasoning was obviously slow in that the application of the tubes to the sockets was inconvenient for the operator, necessitating laborious and awkward movements and a considerable amount of time was expended. Furthermore, a machine of the type as heretofore employed would only operate to season radio tubes at a comparatively low rate of speed or low output per hour and occupied an excessive amount of floor space, moreover with a seasoning machine as above mentioned it was necessary to handle the seasoned tubes between the seasoning operation and the operation known as testing.

The testing operation constitutes the last step in tube manufacturing prior to wrapping and may be automatically performed on a testing device such as disclosed in a copending application, Serial No. 168,541 filed February 16, 1927, and assigned to the assignee of the present invention. It will be obvious, therefore, that in radio tube manufacture a decidedly advance step in the art will result from the coupling of the seasoning machine with the automatic testing machine which combination was impractical with seasoning machines as heretofore constructed.

It is an object of the present invention, therefore, to provide a machine for seasoning electrical devices at a high rate of speed in an efficient and convenient manner.

Another object of the invention is to provide a seasoning machine wherein devices may be seasoned and automatically discharged.

Another object of the invention is to provide a seasoning machine in which devices may be seasoned at a high rate of speed with the utilization of a minimum amount of floor space.

Another object of the invention is to provide a seasoning machine for electrical devices in combination with a machine for testing such devices wherein seasoned devices may be automatically transported and applied to the testing machine.

Other objects and advantages of the invention will be more fully understood by reference to the accompanying drawings in which, Fig. 1 is a side elevational view of an automatic seasoning machine constructed in accordance with the present invention, an end portion of the machine being removed so as to more clearly show a commutator and brushes.

Fig. 2 is a perspective view of a radio tube as an example of one type of device which may be applied to the present machine.

Fig. 3 is an enlarged view looking toward the right hand end of the machine shown in Fig. 1.

Fig. 4 is an enlarged fragmentary view of an end of the machine shown in Fig. 1 showing the commutator and brushes.

Fig. 5 is an enlarged view, similar to Fig. 2 but showing mechanism for discharging tubes from the machine.

Fig. 5a is a detailed view of a portion of one of the conveyors showing its connection with driving mechanism.

Fig. 6 is a fragmentary detail view of tube discharging mechanism.

Fig. 7 is a fragmentary view looking in the direction of arrow "X" and showing one end of the machine illustrating mechanism for discharging tubes.

Fig. 8 is a perspective view of the machine shown in Fig. 1 coupled to a machine for testing electrical devices.

Fig. 9 is a side elevational view showing a mechanism for transporting tubes from the seasoning machine to the testing machine.

Fig. 10 is a plan view of the seasoning and testing machine with mechanism for conveying tubes from one machine to the other.

Fig. 10a is a detail view showing mechanism for driving belt conveyors, and

Fig. 11 is a diagrammatic view showing the circuits used in connection with the seasoning operation.

In carrying out the present invention the construction of the seasoning machine has been altered from the form of a disc as above mentioned to that of a cylinder. In this manner an extremely large area for holding tube receiving sockets is attainable, so that a large volume of devices may be subjected to a seasoning operation on a machine that occupies but a fraction of the space necessary for the testing of the same volume of tubes on machines as heretofore constructed.

In accordance with the present invention a machine may be constructed by providing a cylindrical framework on which a plurality of units or removable panels may be mounted, each of the panels having a plurality of sockets for the reception of a given number of electrical devices. The sockets may be connected with suitable brushes engaging a commutator, and the said cylindrical framework may be mounted on a horizontal axis so that when rotated the various sockets and consequently the devices therein may receive electrical energy for the seasoning operation. The cylinder may rotate at a predetermined speed continuously and in practice this speed is sufficiently slow to permit mechanism to operate for the discharge of seasoned devices each time a plurality of such devices reach a discharge position. The automatic discharge of seasoned or treated tubes has been taken advantage of in the present machine by providing a cooperation conveyor for automatically transferring the seasoned tubes to a tube testing machine.

Referring to the drawings a cylinder or carrier for the radio tubes is indicated as a whole by the numeral 10. This cylinder is suitably secured to a shaft 11 mounted in end bearings 12 and 13 supported on a framework 15 which in turn is secured to a bed plate 16. Mechanism for rotating the conveyor may comprise a motor 17 connected by gear wheels 18 and 19 with standard speed reduction gearing indicated by the numeral 20. The reduction gearing is connected with and rotates a shaft 21 suitably supported in bearings 22 and 23 at opposite ends of the machine. The shaft 21 has secured thereto a bevelled gear 24 in mesh with a bevelled gear 25 mounted at one end of a shaft 26, the opposite end of the said shaft being provided with a worm 27 in mesh with a worm wheel 28 secured to the horizontal shaft 11 of the cylinder 10, the cylinder therefore may be rotated at a predetermined speed in the direction of arrow "Y".

For the purpose of supporting radio tubes or the like for seasoning the cylinder is provided with a plurality of panels 29, each of the panels in the present construction having six sockets 30 for the reception of contact elements 31 of a radio tube 31' as shown in Fig. 2.

The sockets for receiving the contact elements of an electrical device may be of any suitable type and a panel such as employed in the present invention is more clearly shown and described in a copending application, Serial No. 249,805 filed January 27, 1928, and assigned to the assignee of the present invention.

In the present construction the sockets of the panels may be connected with brushes 32, 33, 34 and 35 which in turn engage stationary commutator contacts 36, 37, 38 and 39 respectively, and their electrical connections with the panels 29 will hereinafter be more fully described.

As shown in Fig. 10, radio tubes 31' may be fed from another machine to an incline guide 40 and thence to a conveyor 41. The conveyor 41 is driven by means of a bevelled gear 42 secured to a shaft 43 of one of the rollers 44 of the conveyor 41. The said bevelled gear 42 is disposed in mesh with a bevelled gear 45 (see Fig. 5a) positioned at one end of a vertical shaft 46 the opposite end of said shaft being provided with a bevelled gear 47 in mesh with a bevelled gear 48 secured to a shaft 49 journaled in a bearing 50.

The shaft 49 is provided with a sprocket 49' and connected by a chain 50' with a sprocket wheel 51' secured to shaft 21.

When the tubes reach the conveyor 41 they are carried along in front of the seasoning machine and as the same rotates one or more operators apply the tubes to the sockets 30. It is to be understood that the cylinder 10, in order to properly subject the tubes to a seasoning schedule, rotates at a low rate of speed which permits the operators to conveniently load the sockets. After the tubes in the sockets have been moved with the cylinder through the complete path necessary for the seasoning operation, they have completed a cycle and reach position "A" as indicated in Fig. 5. Upon reaching this position the tubes are fully seasoned and ready to be discharged.

Discharge mechanism is provided in the form of a plurality of bifurcated members 51 mounted on a shaft 52 extending along the length of the machine. The said members are equal in number to the number of tubes in a series or a longitudinal row of tubes in a row of panels. The shaft 52 is mounted in a bearing 53 on a slide plate 54, the said plate being movably supported on the framework 55.

Mechanism for actuating the members 51 and the slide plate 54 may comprise a link 56 (see Fig. 6) having one end secured to the shaft 52 and the opposite end provided with an offset rollers 57 disposed in operative relation to a slotted cam 58 mounted on shaft 21.

As the cylinder moves to position seasoned radio tubes adjacent to the members 51, the cam 58 operates to move the said members so that the forked portion of each member embraces the base portion of a tube at which time the slide plate 54 is moved away from the cylinder 10 thereby removing the tubes from their sockets. The said tubes then being free to move slide down the inclined surfaces of the plate 54 through suitably provided apertures 54' and on to a conveyor 61.

Mechanism for actuating the slide plate 54 may comprise a link 62 pivotally connected at 63 with the slide plate. The free end of the said link being pivoted at 64 to one end of a lever arm 65, the opposite end of the said arm being pivoted at 66 to a stationary portion of the machine. Intermediate the ends of the lever arms 65 is provided a roller 67 disposed in a slot 68 of a cam 69, the said cam being secured to shaft 21.

For the purpose of balancing the action of the slide plate 54 and the members 51 and the cams 58 and 69 as well as the mechanism connecting them with the said members 51 and the slide plate 54 are provided at both ends of the machine. The above description of one of these mechanisms will, however, answer for both.

As the tubes are discharged from the cylinder they are carried by means of the conveyor 61 to a radio tube testing machine indicated as a whole by the numeral 70. This testing machine may be the same as that disclosed in the above mentioned copending application and may comprise a rotary conveyor 71 having a plurality of notches 72 for the reception of tubes to be tested.

The said conveyor is mounted on a vertical central shaft 73 which may be driven by any suitable source as for example, a motor (not shown). The shaft 73 is provided with a bevelled gear 74 in mesh with a bevelled gear 75 at one end of a shaft 76. The opposite end of the shaft 76 is provided with a sprocket wheel 77 over which an endless chain conveyor 78 is led, the said chain passing around an idler sprocket wheel 79 and a supporting sprocket wheel 80.

The chain conveyor 78 is provided with transverse projections 81 disposed in spaced relation to provide sockets 82 to receive tubes from the conveyor 61. The conveyor 61 may include a belt 83 mounted on rollers 84 and 85 (see Figs. 5 and 9). The said conveyor 61 is driven by means of a worm-wheel 86 secured to a shaft 87 upon which the roller 84 of the conveyor 61 is mounted. The said worm-wheel 86 is disposed in mesh with a worm 88, which is rotated by means of its chain connection 50' with the shaft 21.

As the conveyor moves, the radio tubes thereon are carried toward the conveyor 78. Intermediate the conveyor 61 and conveyor 78 (see Fig. 9) is disposed means in the form of a paddle wheel 89 for retarding the movement of the tubes from one conveyor to the other, the said wheel includes blades 92 and is rotatable on a shaft 90 supported in a bracket 91. The blades of the wheel 89 engage a tube as it travels from the conveyor 61 to prevent its too rapid movement by reason of its potential energy and causes the same to be deposited in a pocket 82 of the chain conveyor 78 without jar which might otherwise disturb the delicate internal structure of the tube.

Tubes deposited upon the chain conveyor are moved toward the testing machine and as the chain moves around the sprocket 77 the tubes are successively deposited in the notches 72 of the conveyor 70 of the testing machine, it being obvious that the said mechanisms are so timed as to permit a continuous operation and the successive deposit of the tubes. As the conveyor 70 moves, the tubes are forced into the sockets provided in the conveyor by a presser arm 93 and are subsequently subjected to a testing operation and discharged to a multiple chute 94, the said chute having a plurality of guide-ways to receive tubes having different characteristics, the tubes being separated into groups in accordance with the operation of testing machine.

During the seasoning operation of the radio tubes, they attain a relatively high temperature and it is of advantage to apply the said tubes to the testing machine while in a heated condition. For this purpose an oven 100 is provided (see Fig. 9) having inlets 101, 102 and 103 for the passage of heated air through a conduit 104 from a suitable source (not shown). The oven 100 is so constructed as to be disposed above the tubes being carried on the conveyor 78 so as to keep the tubes at a desired temperature for application to the testing machine.

From the foregoing description it will be evident that radio tubes may be fed to the seasoning machine and moved through a seasoning schedule after which they are automatically discharged and transported to the testing machine. The seasoning operation is accomplished by connecting the sockets of the panels 29 with the brushes 32, 33, 34 and 35 and the electrical circuit connecting the brushes is shown in Fig. 11.

It will be understood that a radio tube includes a filament or cathode, a grid or control element and an anode or plate.

In performing a seasoning operation electrical energy is passed through the filament and a potential is also impressed upon the grid and plate. Electrical current may be supplied from a suitable source, (not shown) to tracks 36, 37, 38 and 39 of a stationary commutator over which the brushes 32, 33, 34 and 35 respectively are moved.

Referring to Fig. 11 of the drawing, current for the minus filament is supplied through brush 32, current for the plate passes through brush 33, current for grid passes through brush 34 and current for the plus filament through brush 35. A set of four brushes serves for a battery of panels and as shown, eight panels are electrically connected to the said brushes. Thus the machine may have any suitable number of panels divided into units with a set of brushes for each unit. The circuit shown is for one battery or unit of panels and a description of the same will answer for all.

For the purpose of lighting the filament of a tube the brush 32 is provided with a conductor 110 which connects one side of a filament in each of the tubes in one half of the battery of panels said half of the battery being indicated as A. The conductor 110 is provided with conductor 111 which connects with one side of the filament in each of the tubes in the other half of the battery of panels which half is indicated as B. The opposite or plus sides of the filaments of each of the tubes in panels A are connected by conductor 112 which is also provided with a conductor 113 for connecting the opposite side of the filaments of each of the tubes in panels B.

The plates of tubes in the battery of panels are connected to brush 33 by a conductor 114 having leads 115, 116, 117 and 118 in which resistances in the form of electric incandescent lamps 119, 120, 121 and 122 are provided. The said leads, 115, 116, 117 and 118 are provided with connections 123, 124, 125 and 126 respectively for the passage of electrical energy to the plates of tubes in panels A and B.

The grids of the tubes are supplied with electrical energy through brush 34 connected with a conductor 127 connected with leads 128 and 129 from which by-pass conductors 130, 131, 132 and 133 connect with the grids of tubes in panels A and conductors 134, 135, 136 and 137 connect with the grids of tubes in panels B. Each of the by-pass conductors is provided with a resistance 139 to protect the tubes against a surge or over load of current on one of its elements in the event of a short circuit.

The resistance elements both in the plate and grid lines are as above mentioned in the form of incandescent electric lamps and are so disposed that when a device in the line carrying a particular bulb is defective the bulb will cease to give light and the defective device can be readily located. The lamps serving as resistances are disposed in sockets in the outer surface of the cylinder 10 and in convenient and plain view of the operator.

It will be evident from the above that a plurality of devices such as radio tubes may be simultaneously subjected to a seasoning operation. This operation includes the passage of a given voltage through the electrodes of a tube. The speed of the cylinder may be at the rate of one revolution in 20 to 25 minutes. During this period the brushes 32 and 35 move on tracks 36 and 39 which supply 6.5 volts for passage through the filaments and by reason of the geometric formation of the device it is possible to treat or season eight to ten times more devices than was possible on a disc machine as heretofore employed.

The machine shown as an embodiment of the present invention comprises a drum or cylinder divided into four sections, each section including sixty panels and each panel is provided with six sockets making the machine capable of treating 1440 devices.

The panels are disposed in longitudinal rows of four so that each row holds twenty-four devices which may be ejected simultaneously without terminating the rotary movement of the machine and without interference to the continuous seasoning operation. Thus as the rows of seasoned devices pass the ejecting means twenty-four devices are ejected at once. This is particularly advantageous when the seasoning machine is combined with a testing machine which operates at a higher rate of speed than that performed by seasoning machines as heretofore employed. The capacity of the present machine therefore makes it a practical apparatus for combination with the testing operation as its out-put approaches that of the testing machine and avoids the retardation of this stage of the manufacture of devices to which the present invention relates.

It is to be understood that any suitable seasoning schedule may be employed according to the character of the device and the time element may be varied. For example, radio tubes such as those known as the U. X. 201A, U. X. 112 or U. X. 171 may require the passage of electrical energy through the elements at different voltages and for different time periods. Furthermore it will be evident that the tracks 36, 37, 38 and 39 may be so divided as to apply electrical energy intermittently by separating the tracks into segments insulated from each other so that the brushes will only conduct electrical energy to the device during given portion of the rotation of the cylinder and will conduct electricity during other portions of the travel of the cylinder. Thus any seasoning schedule may be employed and by a simple readjustment or rearrangement of the tracks such schedule may be changed. For example, during a seasoning operation the brushes 32 and 35 move over tracks 36 and 39 which may supply 6.5 volts for passage through the filament, while brushes 33 and 34 move over tracks 37 and 39 to supply a higher voltage as 130 to 150 volts to the plates and grids of the devices.

This voltage may as above set forth be either continuous or intermittent in accordance with the seasoning schedule selected.

The flexibility of the present machine is evident and serves to increase production to the end that manufacturing costs are reduced.

Although a preferred embodiment of the invention is shown and described herein it is to be understood that modifications may be made therein without departing from the spirit and scope of the invention as set forth in the appended claims.

What is claimed is:

1. A machine, for subjecting electrical devices to a seasoning operation comprising seasoning means, a carrier, sockets for supporting a plurality of devices on said carrier, means for moving said carrier about a horizontal axis, means for subjecting said devices to a seasoning schedule during a movement of said carrier and means for discharging seasoned devices during a movement of said carrier.

2. A machine, for subjecting electrical devices to a seasoning operation comprising seasoning means, a carrier, sockets on said carrier for supporting a plurality of devices, means for moving said carrier about a horizontal axis, means for lifting devices from said sockets and means for discharging devices during a movement of said carrier.

3. A machine, for subjecting radio tubes or the like to a seasoning operation comprising seasoning means, a carrier, sockets for supporting a plurality of tubes on said carrier, means for moving said carrier about a horizontal axis and means for simultaneously discharging a plurality of tubes from said sockets during a movement of said carrier.

4. A machine, for subjecting radio tubes or the like to a seasoning operation, comprising seasoning means, a carrier, sockets for receiving the bases of a plurality of tubes on said carrier, means for moving said carrier about a horizontal axis and means for simultaneously lifting a plurality of said tubes from said sockets for discharge from said carrier.

5. A machine for subjecting radio tubes or the like to a seasoning operation comprising seasoning means, a carrier, sockets to receive the bases of a plurality of rows of tubes on said carrier, means for moving said carrier about a horizontal axis, means for subjecting said tubes to a seasoning schedule during a movement of said carrier and means for lifting a plurality of tubes from said sockets during a movement of said carrier.

6. A machine for seasoning electrical devices comprising a carrier, means for supporting a plurality of rows of devices on said carrier and means for simultaneously discharging a row of devices.

7. In combination a seasoning machine having a carrier for electrical devices and a testing machine comprising a conveyor for said devices, device transporting mechanism connecting said machines and means for discharging a device from said carrier, for deposit in said testing machine.

8. A machine for seasoning electrical devices having bases comprising a support, a plurality of base receiving sockets disposed in a horizontal row on said support and means for moving said support and sockets about a horizontal axis and means for simultaneously discharging devices from all the sockets in said row.

9. A machine for seasoning radio tubes comprising a conveyor, a plurality of sockets positioned in spaced relation in a horizontal row on said conveyor, an electrical circuit, means for moving said conveyor about a horizontal axis means for connecting said circuit with said sockets during a movement of said conveyor and means for indicating defects in devices disposed in said sockets.

10. In an apparatus for seasoning and testing electrical devices the combination of a cylindrical conveyor for moving devices through a seasoning schedule, a plurality of rows of device receiving sockets arranged in longitudinal rows on said conveyor, a conveyor positioned to receive a row of devices from said conveyor, a testing machine, means for transferring devices from said conveyor to said testing machine.

In testimony whereof, we have hereunto subscribed our names this 30th day of November, 1928.

JOHN E. FERGUSON.
CHARLES A. NICOLAI.